United States Patent
Drewes et al.

(10) Patent No.: US 10,233,662 B2
(45) Date of Patent: Mar. 19, 2019

(54) STRUT LINKAGE FOR A STEEL CONSTRUCTION, AND STEEL CONSTRUCTION HAVING A STRUT LINKAGE

(71) Applicants: ThyssenKrupp Steel Europe AG, Duisburg (DE); ThyssenKrupp AG, Essen (DE)

(72) Inventors: Stephan Drewes, Mönchengladbach (DE); Mark Hirt, Bochum (DE); Lothar Patberg, Moers (DE); Adrian Paton, Dinslaken (DE); Konstantinos Savvas, Düsseldorf (DE)

(73) Assignees: THYSSENKRUPP STEEL EUROPE AG, Duisburg (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 15/516,235

(22) PCT Filed: Aug. 21, 2015

(86) PCT No.: PCT/EP2015/069278
§ 371 (c)(1),
(2) Date: Mar. 31, 2017

(87) PCT Pub. No.: WO2016/055211
PCT Pub. Date: Apr. 14, 2016

(65) Prior Publication Data
US 2017/0292283 A1    Oct. 12, 2017

(30) Foreign Application Priority Data
Oct. 6, 2014   (DE) ...................... 10 2014 114 472

(51) Int. Cl.
*E04H 12/00*   (2006.01)
*E04H 12/10*   (2006.01)
(Continued)

(52) U.S. Cl.
CPC ............. *E04H 12/10* (2013.01); *E04C 3/04* (2013.01); *F03D 13/20* (2016.05); *F03D 80/70* (2016.05);
(Continued)

(58) Field of Classification Search
CPC . E04H 12/10; E04H 2012/006; E04H 12/342; E04H 12/34; E04H 12/085; F05B 2240/9121; E04B 1/1909
See application file for complete search history.

(56) References Cited

U.S. PATENT DOCUMENTS

| 4,145,149 A | 3/1979 | Ruga |
| 4,187,034 A | 2/1980 | Dziewolski |

(Continued)

FOREIGN PATENT DOCUMENTS

| AT | 168711 B | 8/1998 |
| CN | 1776128 A | 5/2006 |

(Continued)

OTHER PUBLICATIONS

Translation of FR 2907826 provided by Espacenet.com.*
(Continued)

*Primary Examiner* — Brian D Mattei
(74) *Attorney, Agent, or Firm* — Lathrop Gage L.L.P.

(57) ABSTRACT

A strut linkage for a steel construction may involve a tower of a wind turbine and/or a corner post of a lattice tower. In order that high forces can be removed via the strut linkage without causing increased stress concentrations, excessive use of material, and/or an excessive structural outlay, a plate element is provided for arranging between, preferably load-bearing, steel construction components. At least one connection element, which may be connected to the plate element, may be utilized to fasten at least one strut and/or
(Continued)

guy of the steel construction to the steel construction components via the plate element.

20 Claims, 5 Drawing Sheets (51) Int. Cl.
  *F03D 80/70*  (2016.01)
  *E04C 3/04*  (2006.01)
  *F03D 13/20*  (2016.01)
  *E04C 3/02*  (2006.01)

(52) U.S. Cl.
  CPC ............... *E04C 2003/026* (2013.01); *E04C 2003/0495* (2013.01); *E04H 2012/006* (2013.01); *F05B 2230/50* (2013.01); *F05B 2240/9121* (2013.01); *Y02E 10/728* (2013.01); *Y02P 70/523* (2015.11)

(56) References Cited

U.S. PATENT DOCUMENTS

| | | | | |
|---|---|---|---|---|
| 4,334,391 | A | * | 6/1982 | Hedgepeth ............ E04H 12/10 52/108 |
| 4,602,470 | A | * | 7/1986 | Stuart .................. E04G 1/06 182/186.8 |
| 4,930,930 | A | * | 6/1990 | Coppa .................. E04B 1/1909 403/170 |
| 9,376,830 | B1 | * | 6/2016 | Watson, III ............ E04H 12/10 |
| 2012/0023861 | A1 | | 2/2012 | Kempf |
| 2015/0218840 | A1 | * | 8/2015 | Paton .................. E04H 12/08 52/651.01 |
| 2015/0361685 | A1 | * | 12/2015 | Abreu .................. E04H 12/10 52/40 |

FOREIGN PATENT DOCUMENTS

| | | |
|---|---|---|
| CN | 202544097 U | 11/2012 |
| CN | 202544200 U | 11/2012 |
| CN | 202611105 U | 12/2012 |
| CN | 103410670 A | 11/2013 |
| DE | 814046 C | 9/1951 |
| DE | 2720029 A | 11/1977 |
| DE | 3940755 A | 7/1990 |
| DE | 4407000 A | 10/1994 |
| DE | 102005014025 A | 9/2006 |
| DE | 102012106772 A | 1/2014 |
| EP | 2013425 B | 1/2009 |
| FR | 1450635 | 6/1964 |
| FR | 2129268 A | 12/1971 |
| FR | 2907826 A | 5/2008 |
| GB | 2142701 A | 1/1985 |
| NL | 6508364 | 6/1964 |
| WO | 2014016166 A | 1/2014 |

OTHER PUBLICATIONS

English translation of International Search Report issued in PCT/EP2015/069278, dated Oct. 19, 2015 (dated Oct. 26, 2015).
English abstract of DE 102005014025A.
English Machine Translation of FR 2129268A.
English Machine Translation of DE 814046C.
English Machine Translation of AT 168711B.
English abstract of DE 4407000A.

* cited by examiner

STRUT LINKAGE FOR A STEEL CONSTRUCTION, AND STEEL CONSTRUCTION HAVING A STRUT LINKAGE

CROSS REFERENCE TO RELATED APPLICATIONS

This application is a U.S. National Stage Entry of International Patent Application Serial Number PCT/EP2015/069278, filed Aug. 21, 2015, which claims priority to German Patent Application No. DE 10 2014 114 472.4 filed Oct. 6, 2014, the entire contents of both of which are incorporated herein by reference.

FIELD

The present disclosure generally relates to strut linkages for steel constructions, including towers of wind turbines and corner posts of lattice towers. The present disclosure also generally relates to steel constructions, including towers of wind turbines and corner posts of lattice towers with strut linkages.

BACKGROUND

Various embodiments of steel constructions are known. As a rule, the steel constructions serve for supporting certain structural elements. One such structural element may be, for example, a working platform. However, in the case of a pylon, the structural element may also be a power cable. Steel constructions are, however, also used as towers of wind turbines. They then support the rotor of the wind turbine and generally also have a transmission and/or generator unit.

If the steel constructions are designed with the effect of a truss structure, load-bearing components, for example in the form of what are referred to as corner posts, have to be connected transversely or diagonally with struts or guys. There is therefore the need for suitable strut linkages which can if necessary serve additionally or exclusively for the fastening of guys.

Strut linkages in the form of what are referred to as cast nodes are already known. These strut linkages are designed as a cast part and are integrated into the steel construction at the required points. However, drawbacks of these strut linkages are their complicated and cost-intensive manufacturing and also their high weight.

In order to be able to save weight and therefore to form the entire steel construction more economically in terms of material and more simply, strut linkages have already been proposed which are welded onto the outer side of steel construction components. If the steel construction components are formed from a hollow profile with a comparatively thin casing in order to save on material and weight, only small forces can be removed via the strut linkages. Otherwise, during operation of the strut linkages, high stress concentrations occur bringing a reduced endurance limit. In addition, the strut linkages are composed of a multiplicity of individual parts which have to be welded in a complicated and cost-intensive manner to one another.

There is therefore a further need of optimization in respect of the configuration of the strut linkages and of the steel constructions.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure concerns refining and developing the strut arrangement and the steel construction in each case of the type mentioned at the beginning and described in more detail above in such a manner that high forces can be removed via the strut linkage without this bringing increased stress concentrations, an excessive use of material and/or an excessive structural outlay.

One example way to achieve this object in a strut linkage is by way of a plate element that can be arranged between, preferably load-bearing, steel construction components. A connection element that is connected to the plate element may be provided for fastening at least one strut and/or guy of the steel construction to the steel construction components via the plate element.

In addition, the aforementioned object may be achieved in a steel construction by way of, for example, a strut linkage wherein a plate element is provided between two, preferably load-bearing, steel construction components. In some examples, at least one strut and/or guy is fastened to the steel construction components via the connection element and the plate element.

By means of the plate element which can be placed in a relatively simple manner between two steel construction components, the forces to be removed by the struts or the guys can be removed in a manner distributed over the cross sections of the steel construction components. This avoids excessive stress concentrations. An increase in the wall thicknesses of the steel construction components can therefore be basically dispensed with.

Furthermore, the plate element can be of quite compact and therefore relatively light design despite a solid constructional form. This is true in particular in comparison with cast nodes which have to be of larger and heavier design. These advantages are not only of benefit in the steel construction, but also in the transportation and the logistics in conjunction with the steel construction.

In addition, the at least one connection element permits a specific fastening of the at least one strut and/or guy to a suitable portion of the plate element. Either only this portion of the plate element has to be reinforced, or a reinforcement of the plate element is entirely dispensed with as a result of the configuration of the connection element. Basically, it may be expedient, for example for the connection of a large number of struts and/or guys, if said struts and/or guys are fastened to the plate element via a plurality of in particular separate connection elements.

In absolute terms, the plate element can be arranged between the steel construction components. However, this is not required according to the invention. On the contrary, it suffices if the plate element is only partially provided between the steel construction components, in particular with regard to portions of the steel construction components. For example, the steel construction components can enter into contact with one another in regions or not be spaced apart from one another via the plate element. This can be the case, for example, outside the plate element or, in the case of a plate element which is not closed over the full surface area, also within the plate element.

For the sake of better comprehension and in order to avoid unnecessary repetitions, preferred refinements of the strut linkage and of the steel construction are described together below without a differentiation always being specifically made between the strut linkage and the steel construction. However, it is apparent to a person skilled in the art with reference to the context which features are in each case preferred in respect of the strut linkage and the steel construction.

In a first preferred embodiment of the strut linkage and of the steel construction, the plate element and the connection element are screwed and/or welded to each other. The welding here has the advantage that the connection is more intimate and thus cannot so easily be inadvertently detached or at least loosened. However, welding is basically more complicated and or protracted than screwing. Screwing has the additional advantage here of making repairs much easier since a damaged strut, a damaged guy and/or a damaged connection element can thus be simply and rapidly exchanged.

For the sake of stability and endurance, it is alternatively or additionally preferred if the plate element and/or the connection element is/are manufactured from metal. Under some circumstances, an at least predominant construction from metal is suitable, for example if a coating, for example of plastic, is provided. The material properties responsible for the stability and endurance are then preferably nevertheless determined by the metal used. If required, the plate element and/or the connection element can be composed of a cast part, in particular if said element can be manufactured relatively simply, compactly and/or easily. However, it will predominantly be preferred to manufacture the plate element and/or the connection element from a metal plate. This mainly generally permits a lightweight and at the same time stable construction, wherein the strength and rigidity can be increased by the fact that the plate element and/or the connection element is/are manufactured from heavy plate. It is appropriate here for reliable removal of force in particular to manufacture the plate element from a heavy plate.

In respect at any rate of the connection element, it can be expedient at least partially to manufacture the latter by bending, deep drawing and/or stamping. Even more complicated three-dimensional structures can thereby be provided simply and cost-effectively. This is expedient in particular for the structure of the steel construction whenever at least two struts and/or guys are fastened to a plate element via the connection element.

Alternatively or additionally, the connection element can be formed from a plurality of connection element parts, in particular metal plates and/or profiles. This is suitable, for example, if it is simpler and/or more protective of materials for the connection element to be of multi-piece design and for the individual parts of the connection element to be connected by welding and/or screwing. Welding enables more complicated structures to be constructed relatively simply, while screw connections can be rapidly joined and easily separated again, as is desirable, for example, for a repair.

In order to reduce the production costs, at least one connection element part can be designed as a deformed sheet metal part. This is not only simple to produce, but can also serve to save on materials. In order to be able to provide high strength and rigidity for the connection element despite a low use of materials, it is furthermore appropriate if the deformed sheet metal part is provided with a U-shaped cross section. The connection element can basically be produced as a forged part and/or from heavy plate in order to be able to obtain the desired structure in a manner which is simple and protects the materials. If, for example, very high strengths are required, or complexly shaped connection elements are intended to be produced more simply, it may, however, be appropriate to design the connection element as a cast part.

In order to be able to ensure effective use of the struts and/or guys, the connection element can comprise at least one connection limb extending away from the plate element obliquely with respect to the plane of the plate element. For example, a diagonal bracing of the steel construction can be achieved. Alternatively or additionally, at least one guy and/or strut can, of course, also be provided parallel to the plane of the plate element, for example for further bracing of the steel construction. For a stable steel construction and to save on strut linkages, it may be expedient if a plurality of struts and/or guys are fixed to the strut linkages. It is furthermore preferred here if at least two connection limbs extending away from the plate element on opposite sides of the plate element are provided for the fixing of at least one strut and/or guy in each case.

To save on material and to introduce force into the casing surface of a steel construction component, it is appropriate if the plate element is designed as a ring or is of at least annular design. The ring is preferably completely closed here although this is basically not obligatory. The plate element may also be, for example, of C-shape design. However, at least one of the steel construction components is then additionally preferably designed in a manner corresponding to the plate element.

In respect of the steel construction, it can aid the structural simplification and the simpler installation if the plate element at least partially protrudes outward in relation to the steel construction components. Namely, at least one strut and/or guy can then be fastened to the steel construction components via the connection element and that portion of the plate element which protrudes outward in relation to the steel construction components. An outwardly protruding portion of the plate element is understood as meaning in particular a portion protruding laterally with respect to at least one steel construction component. In the case of steel construction components with an approximately circular cross section, the corresponding portion of the plate element can extend radially outward.

In order to be able to connect the plate element simply and rapidly to the steel construction components, and/or in order to be able to provide said plate element between the steel construction components, it is appropriate if at least one of the steel construction components comprises a flange which interacts with the plate element and is in particular of corresponding design. This is true in particular even if the at least one steel construction component is predominantly designed as a hollow profile or hollow construction. Then, to save on material, a low material thickness of the casing can be provided, and therefore the casing without the flange would under some circumstances not be sufficiently stable to absorb without damage the forces to be removed from the plate element.

Alternatively or additionally, the manufacturing of the steel construction can be simplified if at least one steel construction component engages in a form-fitting manner in the plate element, or vice-versa. The steel construction component and the plate element can then be simply plugged in one another. In addition, a further connection between the steel construction component and the plate element can optionally be dispensed with. To stabilize this form-fitting connection, the at least one steel construction component can comprise a flange corresponding to the plate element. This is true again in particular if the at least one steel construction component is predominantly designed as a hollow profile or hollow construction. Then, to save on material, a low material thickness or wall thickness of the casing can be provided, and therefore the casing without the flange would under some circumstances not be sufficiently stable to absorb without damage the forces to be removed from the plate element. Since it is furthermore preferred to design the two steel construction components identically or similarly, it is particularly preferred if the two steel construction elements grip in a form-fitting manner in each other and/or interact in a form-fitting manner with the plate element. The two steel construction components can then be formed if required with a thin casing. This is true in particular if the two steel construction components comprise a flange which interacts in a form-fitting manner with the flange of the other steel construction component in each case and/or with the plate element or at least is formed in a corresponding manner to the other flange in each case and/or to the plate element.

It is preferred here basically for weight reasons for at least one steel construction component, at least on the other side of at least one flange, to be designed as a hollow profile. The casing is then manufactured from steel preferably for cost reasons and durability reasons. The production is simplified here if the casing is formed from a flat steel product, preferably a strip material.

At least one steel construction component can have a longitudinal axis. It is then structurally appropriate if either the at least one strut, at least one guy and/or the at least one connection limb of the connection element extends obliquely with respect to at least one longitudinal axis of a steel construction component. Obliquely here means in particular that the connection limb, the strut and/or the guy encloses an acute angle with a plane defined by the plate element.

In order to be able to save on material, the plate element can end at least flush with at least one steel construction component, in particular with the casing thereof and/or the flange thereof. Nevertheless, a stable connection is then obtained between the at least one steel construction component and the plate element. It is furthermore preferred here if only the at least one portion of the plate element that is connected to at least one connection element protrudes in relation to the at least one steel construction component, the casing and/or flange thereof.

Figure 1:
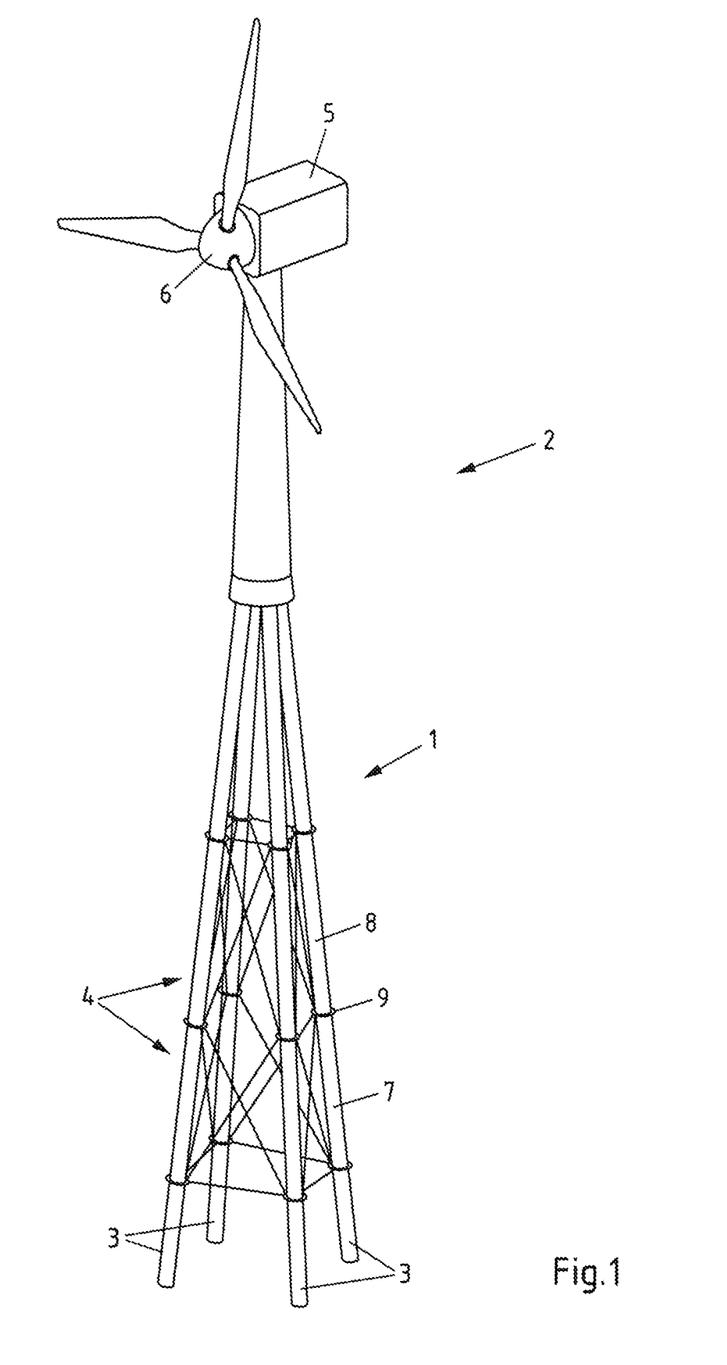
FIG. 1 is a perspective view of an example steel construction in a form of a tower of a wind turbine.

FIG. 1 illustrates a steel construction 1 in the form of a tower of a wind turbine 2. The tower is at least partially designed here in the manner of a truss structure. The steel construction 1 which is illustrated is at least partially formed by a lattice tower with four load-bearing corner posts 3 here and struts 4 which are braced in between and stabilize the lattice tower, but are not load-bearing or are load-bearing only to a limited extent, depending on the loading. In addition, the tower supports a wind turbine with what is referred to as a nacelle 5 and the rotor 6.

Figure 2A:
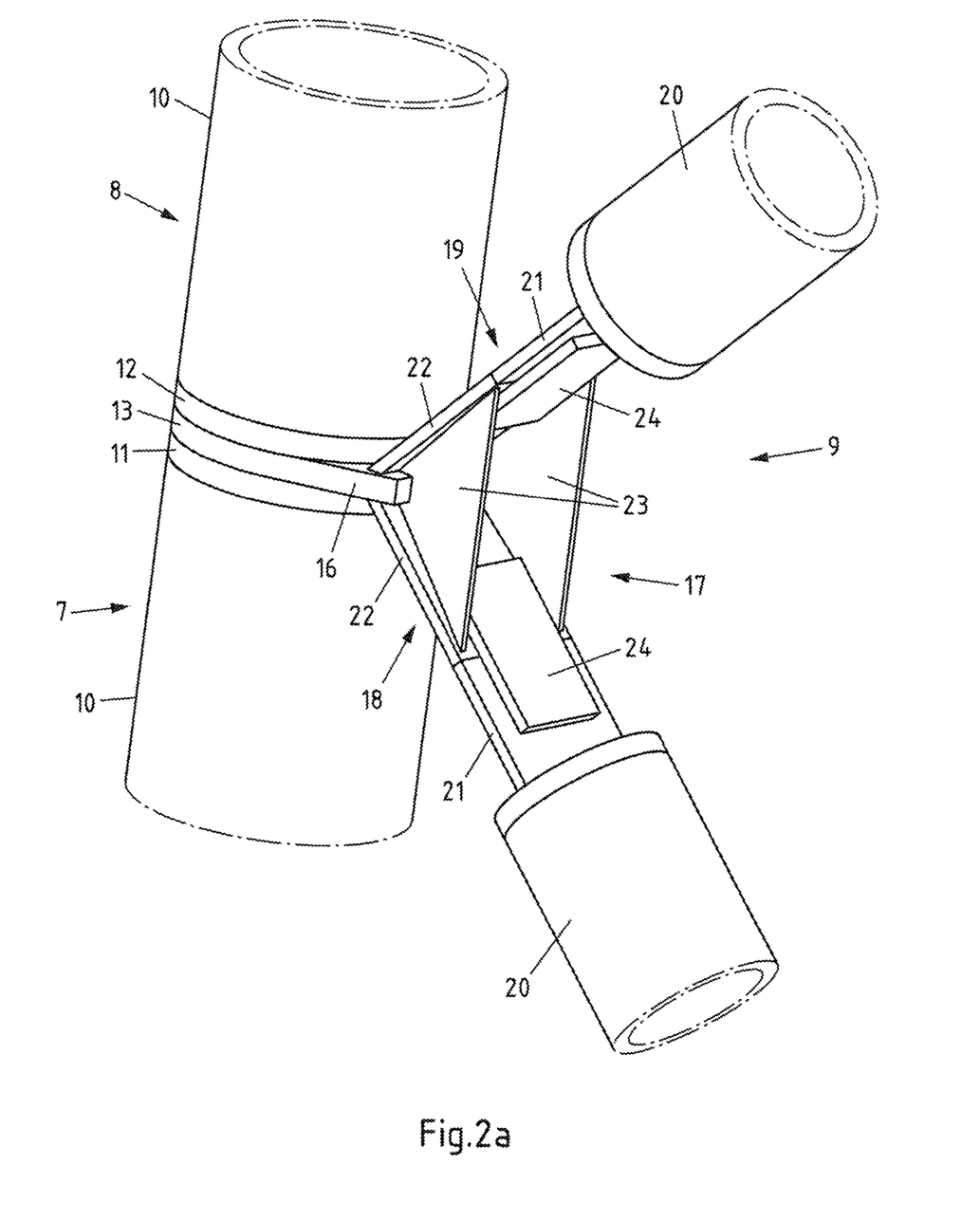
FIG. 2a is a perspective view of the example steel construction of FIG. 1 in a region of a first strut linkage.
Figure 2B:
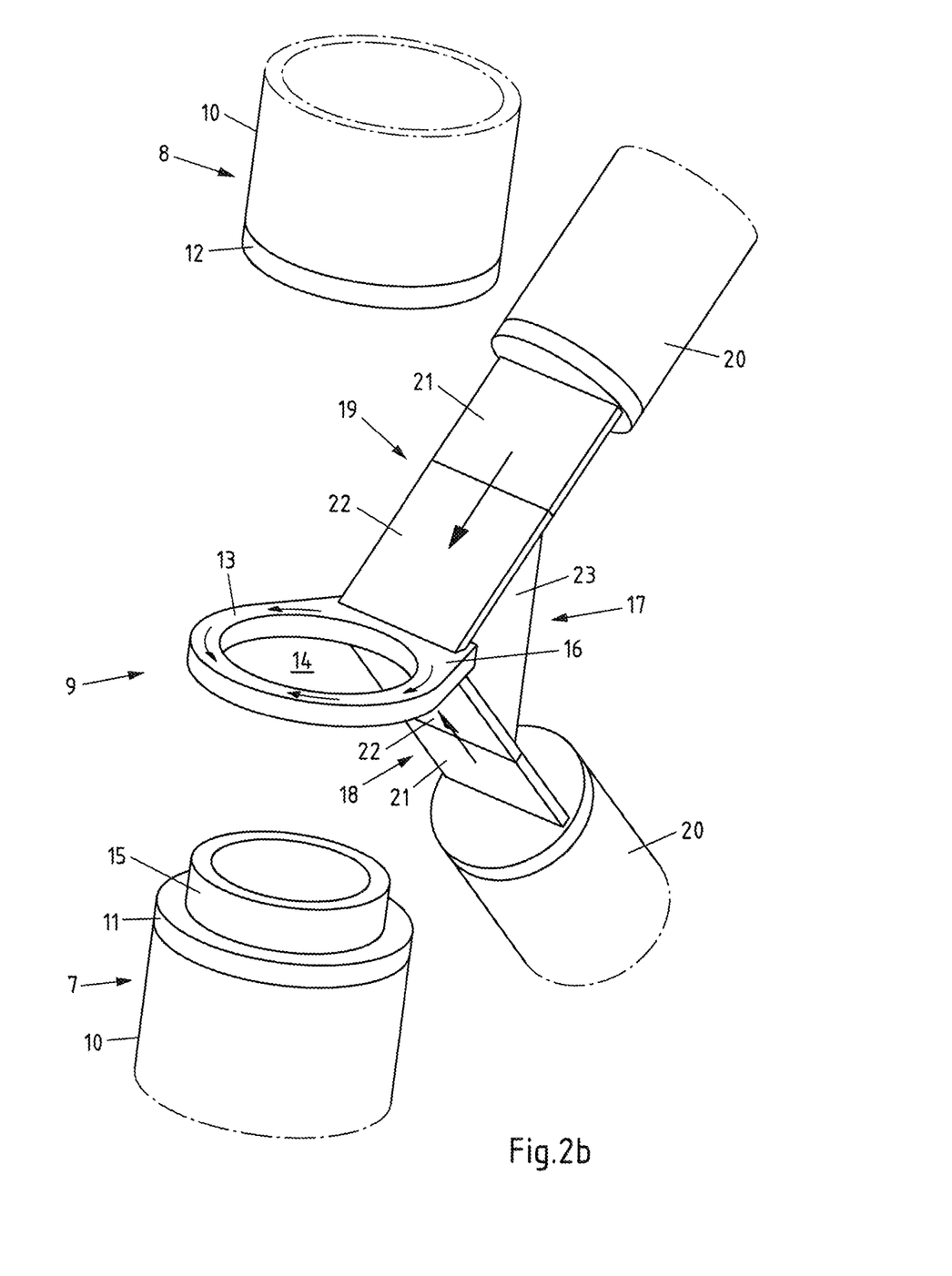
FIG. 2b is an exploded view of the example steel construction of FIG. 1 in a region of a first strut linkage.

FIGS. 2a and 2b illustrate a detail of the steel construction 1 from FIG. 1 with two adjacent steel construction components 7,8 of a corner post 3 and a strut linkage 9 arranged in between. The steel construction components 7,8 which are illustrated and are to this extent preferred are designed as hollow profiles with a substantially circular cross section. If required, the steel construction components 7,8 can taper upward, i.e. can be of substantially conical design. The steel construction components 7,8 predominantly have a casing 10 made of steel plate. A flange 11,12 is provided at least one end of the steel construction components 7,8 which are illustrated and are to this extent preferred. The flange 11,12 can likewise have a central opening, but is preferably formed with a material thickness which is significantly greater than the casing 10.

The strut linkage 9 comprises a plate element 13 designed in a corresponding manner to the adjacent flanges 11,12 of the steel construction components 7,8. The plate element 13 which is illustrated and to this extent is preferred is of annular design here with a central opening 14. In addition, the flanges 11,12 of the two steel construction components 7,8 and the plate element 13 are designed in a manner corresponding to one another such that the two steel construction components 7,8 and the plate element 13 grip in a form-fitting manner in one another. In the steel construction 1 which is illustrated, an inner edge 15 of the flange 11 of the lower steel construction component 7 engages both in a form-fitting manner in the central opening 14 of the plate element 8 of the strut linkage 9 and in the central opening of the flange 12 of the upper steel construction component 8. The strut linkage 9 and the upper steel construction component 8 can consequently be plugged onto the lower steel construction component 7. In the case of the steel construction 1 which is illustrated and is to this extent preferred, the plate element 13 is formed from a heavy plate of corresponding thickness by deformation, in particular forging.

The outer diameter of the plate element 13 which is illustrated and is to this extent preferred corresponds over a large part of the circumference of the plate element 13 to the outer circumference of the adjacent flanges 11,12 of the two steel construction components 7,8. The plate element 13 is therefore in particular flush there with the flanges 11,12 of the steel construction components 7,8. On one side, the plate element 13 protrudes in relation to the steel construction components 7,8, specifically laterally outward both in relation to the flanges 11,12 and the casings 10. A connection element 17 of the strut linkage 9 is connected to the plate element 13 at said outwardly protruding portion 16. The connection element 17 here has two connection limbs 18,19 which point obliquely outward and are each connected at their free ends to a strut 20. Instead of the struts 20 which are illustrated and are to this extent preferred, a guy or the like may, however, also be fixed to the connection limbs 18,19. The struts 20 which are illustrated and are to this extent preferred are formed from a hollow profile similarly to the steel construction components 7,8 and are welded to the connection limbs 18,19 via connection pieces 21. However, in principle, a screw connection would also be suitable here.

The configuration of the strut linkage 9 has the effect that the forces which are transmitted and are to be removed from the struts 20 are transmitted to the plate element 13 and are distributed there over the circumference of the plate element 13 and therefore ultimately over the circumferences of the steel construction components 7,8, as is illustrated by the arrows representing the corresponding forces. Accordingly, a uniform force transmission and a uniform removal of the transmitted forces is achieved, and therefore stress concentrations are largely avoided.

The connection element 16 is formed by a plurality of metal plates 22,23,24, in particular made of steel, which are welded to one another. Each connection limb 18,19 is formed here from a metal plate 22 and are connected and stabilized vertically by two further metal plates 23. In addition, the metal plates 22 forming the connection limbs 18,19 also support connection plates 24 for the welding on of the connection pieces 21 of the struts.

Figure 3:
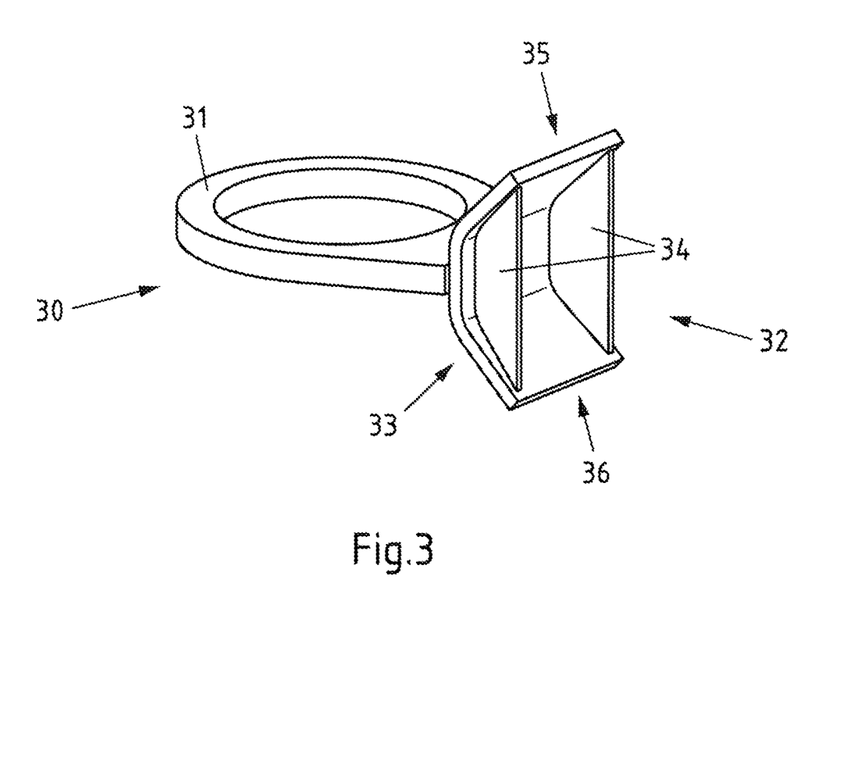
FIG. 3 is a perspective view of another example strut linkage.

FIG. 3 illustrates an alternative strut linkage 30 which comprises a plate element 31 analogously to the plate element 13 of the strut linkage 9 according to FIGS. 2a-b. However, the connection element 32 has fewer individual parts compared to this strut linkage 30. This is achieved by the connection element 32 comprising a sheet metal part 33 which is deformed in an approximately V-shaped manner by bending and can be welded or screwed to the plate element 31. In the case of screwing, screws arranged parallel to the plane of the plate element 31 are appropriate. To reinforce the connection element 32, two metal plates 34 which run vertically and perpendicularly to the plate element 31 and are in the form of supports are welded to the bent-over sheet metal part 33 which is connected to the plate element 31. The supports support the opposite connection limbs 35,36 which each protrude obliquely with respect to the plate element 31 and are formed by bending the sheet metal part 33.

Figure 4:
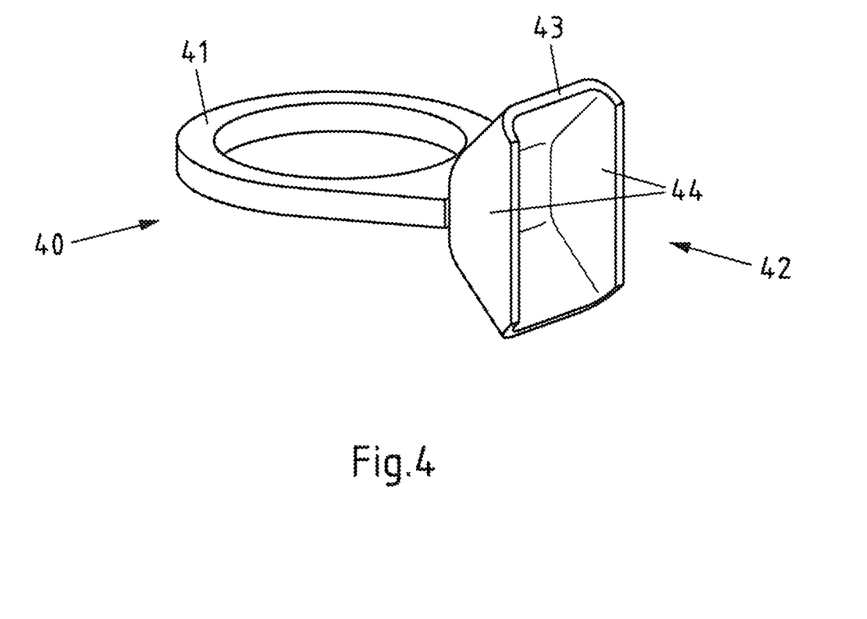
FIG. 4 is a perspective view of still another example strut linkage.

FIG. 4 illustrates a strut arrangement 40 with a plate element 41 and an integral connection element 42 which in turn can be screwed to the plate element 41 by, for example, screws running parallel to the plane of the plate element 41. An alternative to screwing is, for example, a welded joint. The integrity of the connection element 42 is achieved here by the use of a deep drawn part or stamped part 43, wherein a flat product, in particular a flat steel product, for example in the form of a steel plate, is suitable in turn as the starting material. A connection element 42 is thereby obtained which has an approximately V-shaped cross section in a vertical section and an approximately U-shaped cross section in a horizontal section. The welding extent can therefore be reduced and the manufacturing of the connection element 42 accelerated. This is because the supports of the connection element 32 of the strut linkage 30 according to FIG. 3 can be omitted since the supports 44 in the strut linkage 40 according to FIG. 4 are formed by deformation.

Figure 5:
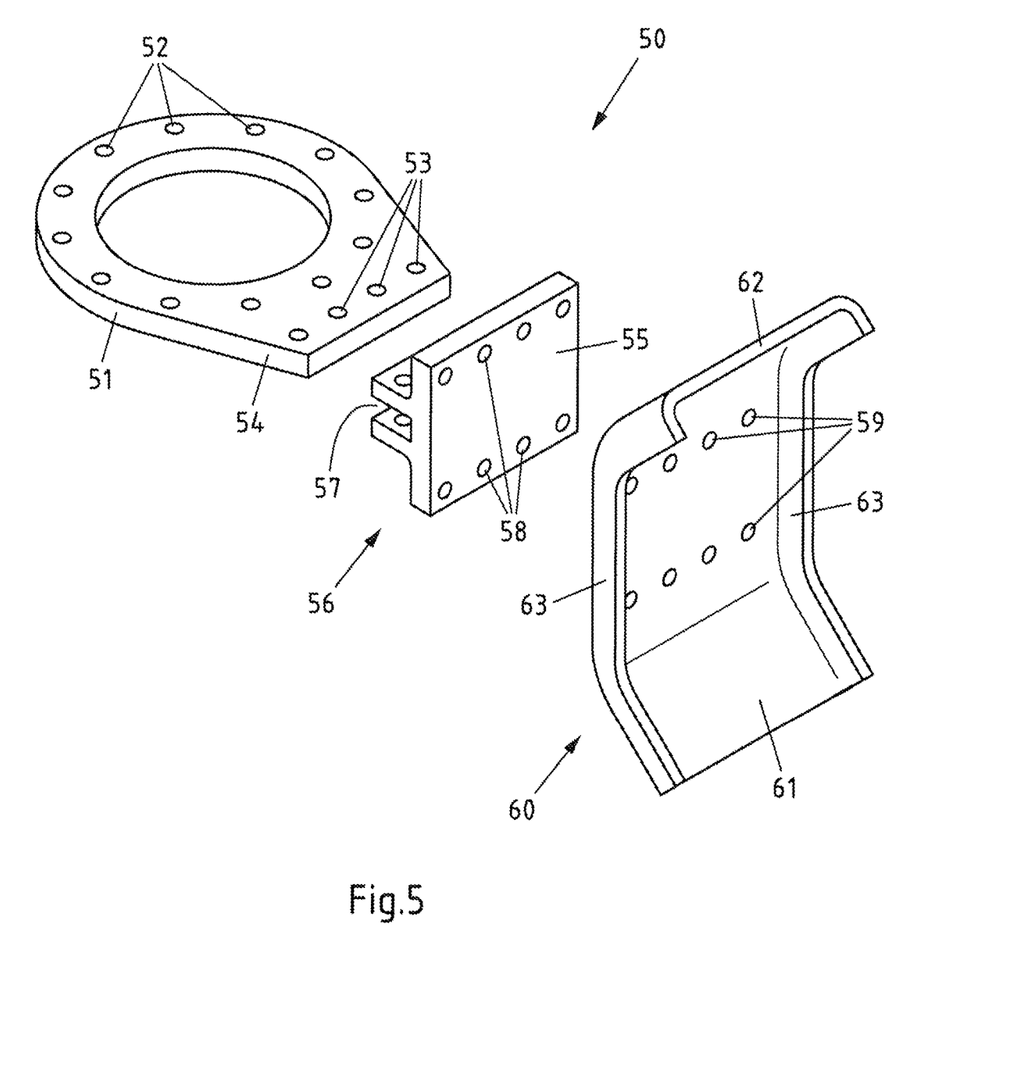
FIG. 5 is an exploded view of yet another example strut linkage.

FIG. 5 illustrates a multipart strut arrangement 50 in an exploded illustration, the individual parts of which are screwed to one another. The corresponding screws are not illustrated here for the sake of better clarity. For the screwing to at least one steel construction component, a plate element 51 has bores 52 in an encircling manner with respect to the annular portion. In addition, bores 53 are provided on that portion 54 of the plate element which protrudes outward in relation to the at least one steel construction component. The corresponding portion 54 of the plate element 51 is screwed to an intermediate piece 55 of the connection element 56 via the bores 53, wherein the plate element 51 is introduced beforehand by the outwardly protruding portion 54 into a groove 57 of the intermediate piece 55. The previously described bores 52,53 and screw connections run substantially vertically. By contrast, in the strut arrangement 50 which is illustrated and is to this extent preferred, the intermediate piece 55 is screwed horizontally via bores 58,59 running substantially horizontally to a profile 60 which provides the connection limbs 61,62 which extend upward and downward obliquely with respect to the plane of the plate element 51. The corresponding profile 60 is curved and is formed with edges 63 which are bent over away from the plate element 51 or are beveled in order to reinforce the profile 60.

Apart from the explained examples of using the strut linkage in corner posts, a strut linkage of the above-described type can also be arranged between other steel construction components. For example, a strut linkage of this type, in particular with a plurality of connection elements distributed over the circumference, can likewise be used with transition nodes between various tower portions or for the fastening of guys between tubular tower segments.

What is claimed is:

1. A strut linkage for a steel construction comprising:
   a plate element configured to be disposed between two load-bearing steel construction components, wherein the plate element is configured as a band with at least a portion that protrudes outward; and
   a connection element connected to the portion of the plate element that protrudes outward, the connection element for fastening at least one of a strut or a guy of the steel construction to the two load-bearing steel construction components via the plate element;
   wherein the connection element comprises a first connection limb that extends at an upwards oblique angle relative to horizontal from a first side of the plate element, and a second connection limb that extends at an opposing downwards oblique angle from a second side of the plate element; and
   wherein an outer diameter of at least 50% of the plate element is substantially the same as an outer diameter of each of the respective load-bearing steel construction components.

2. The strut linkage of claim 1 wherein the plate element and the connection element are at least one of screwed or welded to one another.

3. The strut linkage of claim 1 wherein at least one of the plate element or the connection element is manufactured substantially from metal and comprises at least one of a cast part or sheet metal.

4. The strut linkage of claim 1 wherein the connection element is at least one of bent, deep drawn, stamped, or welded.

5. The strut linkage of claim 1 wherein the connection element comprises a plurality of connection element parts that are at least one of screwed or welded to one another.

6. The strut linkage of claim 5 wherein the connection element is configured as at least one of a deformed sheet metal part, a forged part, a heavy plate, or a cast part.

7. The strut linkage of claim 1 wherein the steel construction is configured as a tower of a wind turbine.

8. The strut linkage of claim 1, wherein the first connection limb and the second connection limb are vertically stabilized by at least one metal plate extending therebetween.

9. A steel construction system, comprising:
a first load-bearing component comprising an inner edge having a first diameter and an outer edge having a second diameter, the inner and outer edges defining a shoulder;
a second load-bearing component operatively coupled to the first load-bearing component;
at least one of a strut or a guy; and
a strut linkage, including comprising:
a plate element comprising a ring disposed between two load-bearing components of the steel construction, the ring having an inner diameter substantially corresponding to the first diameter of the first load-bearing component and an outer diameter substantially corresponding to the second diameter of the first load-bearing component and positioned to rest upon the shoulder of the first load- bearing component, and
a connection element connected to the plate element, wherein the connection element comprises a first connection limb that extends at an upwards angle relative to horizontal from a first side of the plate element, and a second connection limb that extends at an opposing downwards angle from a second side of the plate element, for fastening the at least one of the strut or the guy at the free ends of the limbs and to the two load-bearing components of the steel construction via the plate element.

10. The steel construction of claim 9 wherein the steel construction is configured as a tower of a wind turbine.

11. The steel construction of claim 9 wherein the plate element further comprises a protrusion that extends outward relative to the two load-bearing components, wherein the at least one strut or the guy is fastened to the two load-bearing components via the connection element and the protrusion.

12. The steel construction of claim 9 wherein the two load-bearing components engage one another in a form-fitting manner, the plate element being disposed between the two load-bearing components.

13. The steel construction of claim 12, wherein the construction is devoid of fasteners between the strut linkage and the two load-bearing components when the strut linkage is disposed between the two load-bearing components.

14. The steel construction of claim 9 wherein either the at least one of the strut or the guy, or a connection limb of the connection element extends obliquely relative to a longitudinal axis of the two load-bearing components.

15. The steel construction of claim 9 wherein the plate element includes a protrusion that extends outward.

16. The steel construction of claim 9, wherein the first connection limb and the second connection limb are vertically stabilized by at least one metal plate extending therebetween.

17. A strut linkage for a steel construction comprising:
a plate element configured to be disposed between two load-bearing steel construction components, wherein the plate element is configured as a ring; and
a connection element connected to the plate element, the connection element for fastening a strut or a guy of the steel construction to the two load-bearing steel construction components via the plate element;
wherein the connection element comprises:
a first metal plate having a distal end secured to and extending at an upwards oblique angle from a first side of the plate element, a first connection plate abutting and extending from a proximal end of the first metal plate, and a support plate secured adjacent to a portion of the first metal plate and the first connection plate; and
wherein the strut or guy is attached to the first connection plate.

18. The strut linkage of claim 17, further comprising:
a second metal plate having a distal end secured to and extending at a downwards oblique angle from a second side of the plate element, a second connection plate abutting and extending from a proximal end of the second metal plate, and a support plate secured adjacent to a portion of the second metal plate and second connection plate;
wherein the strut or guy is attached to one of the first connection plate and the second connection plate.

19. The strut linkage of claim 17, wherein:
at least one of the load-bearing components comprises an inner edge having a first diameter and an outer edge having a second diameter, the inner and outer edges defining a shoulder; and
the plate element has an inner diameter generally corresponding to the first diameter of the load-bearing component and an outer diameter generally corresponding to the second diameter of the load-bearing component and is positioned to rest upon the shoulder of the load-bearing component.

20. The strut linkage of claim 19, wherein the plate element further comprises a protrusion that extends outwardly therefrom, and wherein the connection element is connected to the protrusion.

\* \* \* \* \*